Nov. 17, 1931.   A. W. CAPS   1,832,277
PHOTOGRAPHIC CAMERA
Filed Sept. 19, 1928   3 Sheets-Sheet 1

INVENTOR
Arthur W. Caps
BY
his ATTORNEYS

Nov. 17, 1931.  A. W. CAPS  1,832,277
PHOTOGRAPHIC CAMERA
Filed Sept. 19, 1928  3 Sheets-Sheet 2

INVENTOR
Arthur W. Caps
BY
his ATTORNEYS

Nov. 17, 1931.　　　A. W. CAPS　　　1,832,277
PHOTOGRAPHIC CAMERA
Filed Sept. 19, 1928　　3 Sheets-Sheet 3

INVENTOR
Arthur W. Caps
BY
his ATTORNEYS

Patented Nov. 17, 1931

1,832,277

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

PHOTOGRAPHIC CAMERA

Application filed September 19, 1928. Serial No. 306,930.

This invention relates to photographic apparatus and has for its principal object the provision of a generally improved apparatus for holding sensitized sheet material which is simple and efficient, of rugged construction, easy and inexpensive to manufacture, and which will not readily get out of order.

Another object of the invention is the provision of a support for holding sensitized material in position to be exposed within a camera, and means for adjusting this support to bring the sensitized material accurately into the focal plane of the camera.

Another object is the provision of mechanism, preferably audible in character, for indicating to the operator of the apparatus the presence or exhaustion of the supply of sensitized sheet material within a camera.

A further object is the provision of an improved box for holding a supply of sensitized material.

A still further object is to provide means frictionally engaging a roll of sheet material to retard rotation thereof, and mechanism of simple character for adjusting the retarding effect caused thereby.

To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

Figure 1:
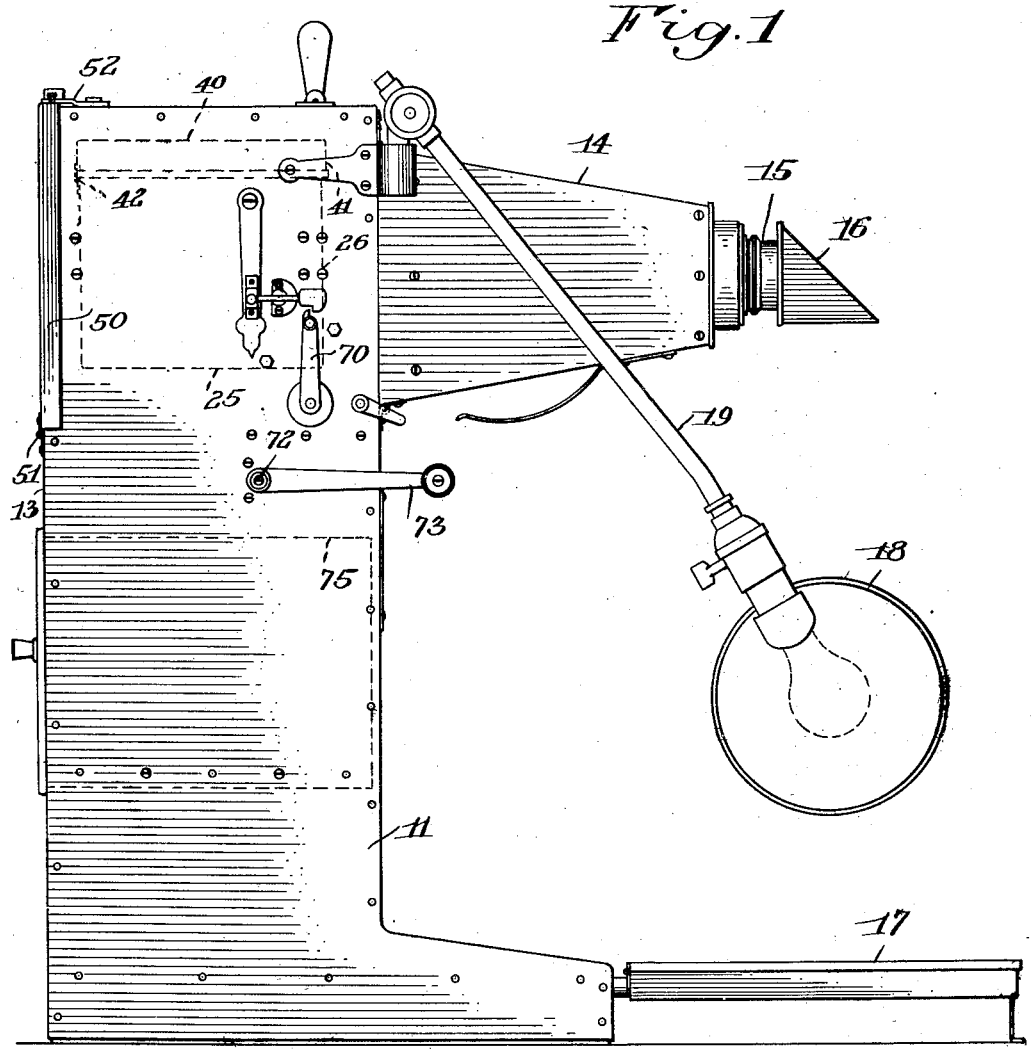
Fig. 1 is a side elevation of one embodiment of photographic apparatus to which the invention may be applied, showing certain features of the invention.
Figure 3:
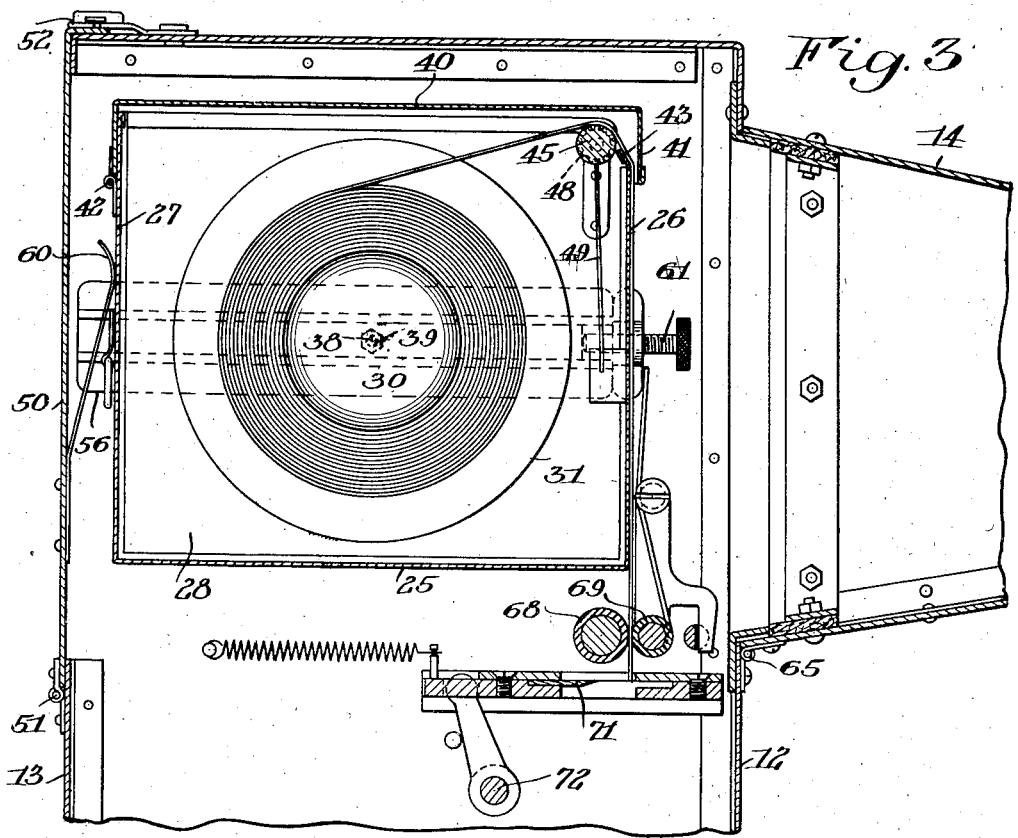
Fig. 3 is a longitudinal vertical section taken approximately centrally through the upper part of the mechanism shown in Fig. 1, illustrating details of the invention.

Referring now to Fig. 1 of the drawings, there is shown one embodiment of photographic apparatus with which the invention may be used, this embodiment comprising side walls 11 forming parts of a camera housing and front and back walls 12 and 13 respectively (Fig. 3). A portion 14 extending forwardly from the main housing at a point near the top thereof carries a lens system within a suitable casing 15, and a prism 16 which bends the light rays through 90° so that the objects to be photographed may be placed upon a horizontal copyholder 17, this copyholder being illuminated by means such as the lighting unit 18 carried by an arm 19 secured to the camera body.

This camera is preferably of the type in which a roll of sensitized sheet material is placed within the camera, successive portions thereof being unwound and held in the focal plane to be exposed, and being fed forwardly and severed from the strip of sheet material after exposure. This roll of sheet material is preferably placed within a roll holding box which is removable from the apparatus, the box and roll being placeable in the camera together as a unit.

Figure 2:
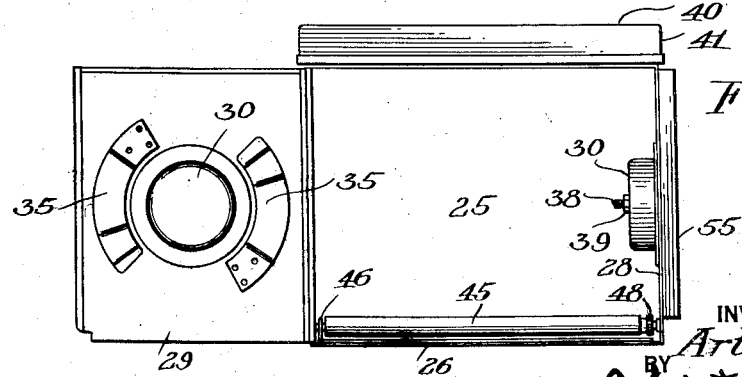
Fig. 2 is a plan of the roll holding box removed from the camera, showing the cover of the box and one end thereof in opened position.

This roll holding box, in the form here shown, is of rectangular shape and comprises a bottom wall 25, a front wall 26, a rear wall 27 and an end wall 28 closing one end of the box. The other end thereof may be provided with a door 29 hinged at its lower edge to the bottom 25, as illustrated in Fig. 2. The fixed end 28 and the hinged end 29 each carry means for supporting a roll of sensitized material within the box, this means preferably comprising the dished or cup-shaped bosses 30 fixed to the inner sides of the ends 28 and 29. These bosses are of the proper dimensions to extend into cavities formed in the spool 31 on which the sensitized material is wound, and thus the bosses constitute trunnions or pivots on which the roll may turn.

Resilient members such as the arcuate leaf springs 35 are fixed to the hinged end 29 adjacent the boss 30 so that these springs will bear against one end of the spool 31 when the end 29 is in closed position. This provides a frictional drag or brake to retard rotation of the roll of sheet material so that it may be stretched more tightly in the focal plane of the camera, as will be described below.

In order to adjust the retarding force of this resilient braking means, a set screw 38 provided with a locking nut 39 may be threaded through the boss 30 on the end wall 28 opposite to the retarding means, the end of this set screw being arranged to contact with the end of the spool 31 and to act as an adjustable abutment for resisting the tendency of the spring 35 to move the roll endwise. By adjusting this screw 38, the roll of sheet material may be moved back and forth a slight distance within the box so that it bears more heavily or less heavily against the spring 35, thus varying the retarding effect caused by these springs. Furthermore, this endwise movement of the roll of sheet material, caused by adjustment of the screw 38, may be used also to vary the position of the sheet material somewhat in the focal plane of the camera, as will be brought out below.

Figure 4:
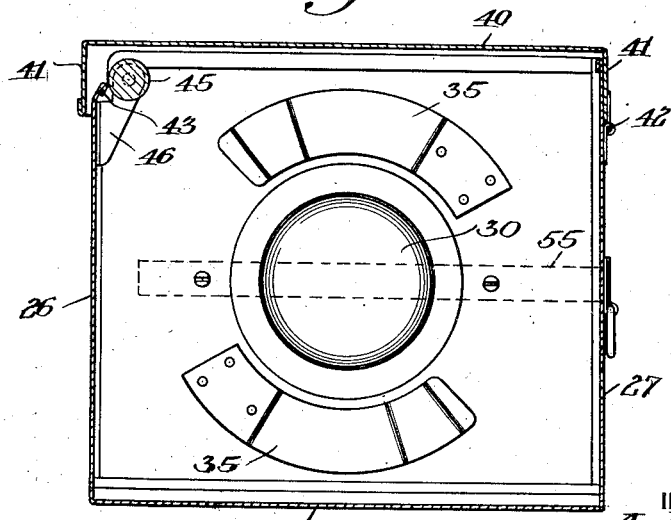
Fig. 4 is a vertical section taken centrally through the box for holding the roll of sensitized sheet material, showing it removed from the camera.

The box has a lid or cover 40 provided with downwardly extending marginal flanges 41, one of these flanges being hinged at 42 to the rear wall 27 of the box. It will be noted from Figs. 3 and 4 that the space between the front and back flanges 41 of the cover is somewhat greater than the distance between the front and back walls 26 and 27 of the box, so that the front flange 41 is slightly spaced from the front wall 26 to leave a slot or opening through which the sheet material may be withdrawn from the box. The front wall 26 has a somewhat less height than the rear wall 27, and is provided with an angular portion 43 at its top to form a guide for the sheet material as shown in Fig. 3.

The hinged connection between the cover 40 and the body of the box insures the location of the cover in predetermined position relative to the box when it is closed, thus making certain that the front flange 41 will be properly spaced from the front wall 26 and preventing the cover from slipping rearwardly to close up this opening at the front and to leave an opening along the back wall, which might occur if the cover were not hinged to the box but were simply placed loosely thereon. Furthermore, the fact that the cover is hinged to the box is of great advantage when working in a dark room, as the cover is always attached to the box and the opeartor need not grope around in the dark in an attempt to find a detached cover.

The hinged end 29 of the box is held in place by the cover 40 when the latter is in closed position, the flange 41 of the cover overlapping the top of the end 29 when the box is closed. In loading the box with a roll of sensitized sheet material, the cover is thrown back and the hinged end 29 is opened as indicated in Fig. 2. The roll of material is then inserted in the box, the end 29 is brought up into position, and the cover of the box is then closed, the end of the strip of sheet material meanwhile having been brought out over the front wall of the box.

Rotatable guiding means may be provided for the strip of sheet material as it issues from the box, in order to reduce friction and to avoid sharp bending thereof. This guiding means may comprise the roller 45 having one end rotatably mounted in a plate fixed to the wall 28 of the box, and the other end supported by an ear 46 secured to the front wall 26 adjacent the opposite end of the box. The sheet material, as it is unwound from the roll, passes over the roller 45 and extends thence through the slot between the front wall 26 and the flange 41 of the lid, as clearly shown in Fig. 3. The roll may be placed in the box so that it is unwound from the top and turns in a clock-wise direction, as illustrated in Fig. 3, or it may be placed if preferred so that it would unwind from the bottom and turn in a counter clock-wise direction, depending on which side of the sheet material has the sensitized coating thereon.

When the sheet material is unwound and fed forward by feeding mechanism to be described below, it is desirable for the operator to have some indication as to whether a supply of material is still within the camera or whether the roll has become exhausted. It is obviously impractical for the operator to open the camera and look at the sheet material, as this would allow leakage of light into the camera. Means may therefore be associated with the roller 45 for indicating whether or not the sheet material is exhausted. As long as any sheet material remains within the box, operation of the feeding means will draw this material forwardly over the roller 45 and will thus rotate the roller. If no sheet material is within the box, however, operation of the feeding means will not result in rotation of the roller. Any suitable mechanism may therefore be provided for indicating to the operator whether or not this roller rotates, and thus the operator will be informed of the presence of exhaustion of the sheet material.

This mechanism, in the present instance, comprises a gear 48 fixed to the roller near one end thereof and a resilient leaf 49 (Figs. 3 and 5) secured to the box at one end and having its free end in the path of the teeth of the gear wheel 48. Whenever the roller rotates, the gear teeth 48 will pass over the leaf 49 with a clicking sound which is easily audible at a point outside of the camera housing, and thus the operator may listen for this sound when he operates the feeding means, and determine in this way whether or not the sheet material is exhausted.

The roll holding box which has been described above is placeable in and removable from the camera housing through a door 50 in the rear of the housing, hinged at 51 (Fig. 3) to the rear wall 13 thereof, and provided with a latch 52 at the top of the housing to hold the door in closed position. This door, it will be noted, is behind and directly opposite the opening in the front wall which is covered by the forwardly extending portion 14 of the camera.

Figure 5:
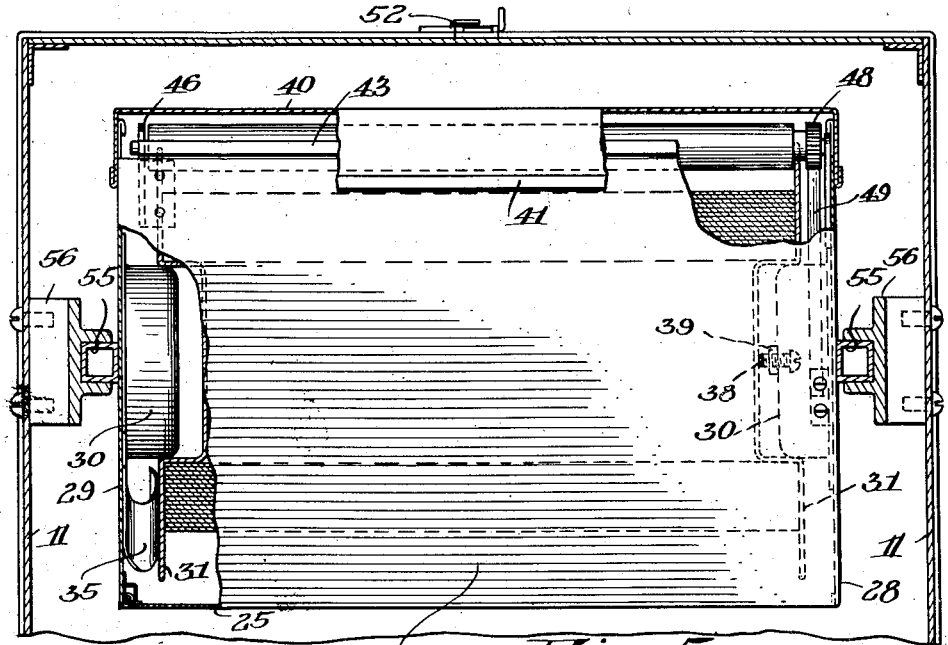
Fig. 5 is a transverse vertical section through the forward part of the camera housing, looking rearwardly, showing the roll holding box in elevation, with parts thereof broken away.
Figure 6:
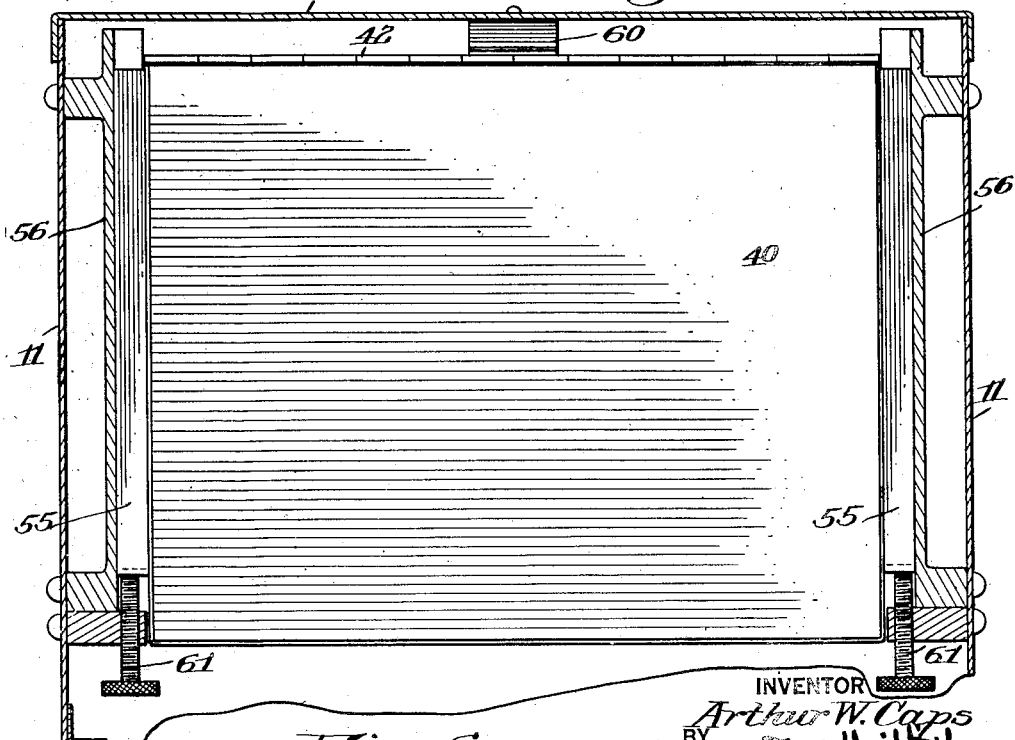
Fig. 6 is a horizontal section through the top of the camera housing showing the roll holding box in plan.

Preferably a pair of guide rails 55 is secured to the ends of the roll box as shown in Figs. 5 and 6, and guideways 56 are secured to the side walls 11 of the camera housing in position to receive these guide rails and to act as supports for the box.

When the box is placed within the camera and when the door 50 is shut, the box is preferably urged forwardly by resilient means such as the leaf spring 60 (Figs. 3 and 6) secured to the door 50. The forward motion of the box may be limited by adjusting screws 61 which bear, for example, against the front ends of the guide rails 55. It will be noted from Fig. 5 that these guide rails 55 may be hollow throughout the greater portion of their length, but the forward ends thereof are closed as indicated in Fig. 6 to provide bearing surfaces for the screws 61.

In the present embodiment of photographic apparatus, the front wall 26 of the box forms the support over which the sensitized material is stretched during exposure, as illustrated clearly in Fig. 3. It is therefore essential that the box be placed in proper position within the camera so that the sheet material supported by the front wall 26 will lie accurately in the focal plane. It is for this reason that the adjusting screws 61 are provided. They may be reached for adjustment through the exposure opening in the front wall 12 of the camera which is covered by the extension 14, since this extension is preferably hinged at its lower edge as at 65 so that it may be dropped down when desired to obtain access to the adjusting screws and to other parts of the apparatus if necessary. Any suitable latch mechanism may be employed for holding the extension 14 up in the position shown in Figs. 1 and 3.

When the adjusting screws 61 have been set to proper position, the accurate placing of the sheet material in the focal plane is insured in spite of withdrawal of the box from the camera and replacement therein, since the spring 60 always moves the box forwardly into contact with the adjusting screws and holds it there. The adjusting screw 38 at one end of the roll of sheet material may be used, if necessary, to move the roll endwise so that the portion of the sheet stretched in the focal plane may be adjusted sideways therein.

Below and substantially in the plane of the front 26 of the box when it is in the camera in operating position, there may be placed suitable sheet feeding mechanism such as the rolls 68 and 69 (Fig. 3) operated by means such as the crank 70 (Fig. 1). When a section of exposed sheet material has been fed downwardly by these rolls, it may be severed from the remainder of the strip by reciprocating the knife 71 operated by arms on a shaft 72 (Fig. 3) which may be rotated by a lever 73 (Fig. 1). The severed sheets then drop into a suitable receptacle such as the drawer 75 shown in dotted outline in Fig. 1, from which they may be removed as desired by the operator.

The cowl opening in the front wall of the casing and the door 50 in the rear wall provide convenient access to the interior of the casing from both sides of the focal plane, so that all parts within the casing may be reached easily.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. In a photographic apparatus, the combination with a box for holding a roll of sensitized sheet material, said box having one end hinged to the body of said box, of resilient means mounted on said hinged end for engaging one end of a roll within said box to retard rotation thereof, and an adjustable abutment screw contacting with the opposite end of said roll for adjusting the longitudinal position of the roll and thus varying the retarding effect produced by said resilient means.

2. In a photographic apparatus, the combination with a box for holding a roll of sensitized sheet material, of an adjustable abutment screw mounted on said box in position to engage one end of said roll substantially at the axis of rotation thereof, and resilient means to engage the opposite end of said roll, said resilient means tending to move said roll into contact with said abutment screw, and said abutment screw being adjustable to vary the longitudinal position of said roll within said box.

3. In a photographic apparatus, the combination with a housing forming an exposure chamber of a camera, said camera having a focal plane within said exposure chamber, of a roll of sensitized sheet material arranged to have portions thereof unwound and placed in said focal plane, an adjustable abutment engaging one end of said roll, and resilient means engaging the opposite end of said roll and tending to move said roll into contact with said abutment, said abutment being adjustable to vary the position of said roll and thereby to vary the position of the portion of said sheet material in said focal plane.

4. In a photographic apparatus, the combination with a housing forming an exposure chamber for a camera and having a focal plane therein, of supporting means within said housing for holding sensitized sheet material, guide rails secured to said supporting means, resilient means tending to move said supporting means and guide rails in one direction, and adjustable abutment mechanism contacting with said guide rails for limiting said movement, said mechanism being adjustable to aline a portion of said sensitized sheet material accurately with said focal plane.

5. In a photographic apparatus, the combination with a housing forming an exposure chamber for a camera and having a focal plane therein, of a box movable within said housing for holding a roll of sensitized sheet material, one wall of said box serving as a support for holding sheet material in position to be exposed, said housing having a door through which said box is insertable and removable, resilient means mounted on said door tending to move said box in one direction, said housing also having an opening therein, a housing extension covering said opening and shiftable to a position uncovering said opening, and adjustable abutment mechanism within said housing and accessible through said opening when it is uncovered, for limiting said movement, said mechanism being adjustable to vary the position of said wall of said box to place the sheet material to be exposed accurately in the focal plane.

6. In a photographic apparatus, the combination with an exposure chamber housing having a front wall, a back wall, and a focal plane between said walls, said front wall having an opening through which light may enter for making an exposure and said back wall having a door therein, of a box for holding a roll of sensitized sheet material, said box being placeable in and removable from said housing through said door, one wall of said box serving as a support for holding sheet material in position to be exposed, resilient means mounted on said door tending to move said box forwardly within said housing when said box is placed therein and when said door is closed, and abutment mechanism including an adjusting screw for limiting the forward movement of said box, said mechanism being adjustable to place a portion of the sheet material supported by said wall of the box accurately in the focal plane.

7. In a photographic apparatus, the combination with a housing forming an exposure chamber for a camera, of a box movable within said housing, trunnion means mounted on opposite ends of said box for holding a roll of sensitized sheet material, a pair of guideways mounted on said housing, and a pair of guide rails secured to said ends of said box on which said trunnion means are mounted for cooperation with said guideways.

8. In a photographic apparatus, the combination with a housing forming an exposure chamber for a camera, of a box for holding a supply of sensitized sheet material, said box being placeable in and removable from said housing, said box having an opening through which a roll of sheet material may be inserted in said box, an end hinged to the body of said box, trunnion means mounted on said hinged end for supporting said roll, guide means also mounted on said hinged end, and guide means mounted on said housing for cooperation with said guide means on said hinged end to guide said box.

ARTHUR W. CAPS.